United States Patent
Wagner et al.

(10) Patent No.: US 7,427,102 B2
(45) Date of Patent: *Sep. 23, 2008

(54) VEHICLE SEAT WITH SEATING COMPONENTS ADJUSTABLE WITHIN A SPATIAL CONSTRAINT

(75) Inventors: Wolfgang Wagner, Friedrichshafen (DE); Jürgen Baumann, Bodman-Ludwigshafen (DE)

(73) Assignee: Recaro Aircraft Seating GmbH & Co., Schwabisch Hall (DE)

( * ) Notice: Subject to any disclaimer, the term of this patent is extended or adjusted under 35 U.S.C. 154(b) by 12 days.

This patent is subject to a terminal disclaimer.

(21) Appl. No.: 11/418,201

(22) Filed: May 5, 2006

(65) Prior Publication Data

US 2006/0261648 A1 Nov. 23, 2006

Related U.S. Application Data

(63) Continuation of application No. 10/467,829, filed on Aug. 13, 2003, now Pat. No. 7,073,855.

(51) Int. Cl.
*A47C 7/62* (2006.01)

(52) U.S. Cl. .............. 297/217.3; 297/217.1; 297/216.1; 297/216.13

(58) Field of Classification Search ............. 297/216.1, 297/21.13, 217.3, 216.13; 244/122 R, 118.5; 280/735, 734
See application file for complete search history.

(56) References Cited

U.S. PATENT DOCUMENTS

| | | | |
|---|---|---|---|
| 3,981,520 A | 9/1976 | Pulling | |
| 4,047,758 A | 9/1977 | Whitehill | |
| 4,408,738 A | 10/1983 | Mazelsky | |
| 4,635,999 A | 1/1987 | Simpson | |
| 4,678,229 A | 7/1987 | Ryan et al. | |
| 4,819,987 A | 4/1989 | Stringer | |
| 5,681,084 A | 10/1997 | Yoneda | |
| 5,722,722 A | 3/1998 | Massara | |
| 5,772,280 A | 6/1998 | Massara | |
| 6,042,190 A | 3/2000 | Mathe et al. | |
| 6,059,364 A | 5/2000 | Dryburgh et al. | |
| 6,076,887 A | 6/2000 | Andersson | |
| 6,095,610 A | 8/2000 | Okajima et al. | |
| 6,227,489 B1 | 5/2001 | Kitamoto et al. | |
| 6,227,563 B1 | 5/2001 | Talisman | |
| 6,494,536 B2 | 12/2002 | Plant | |
| 6,583,596 B2 | 6/2003 | Nivet et al. | |

FOREIGN PATENT DOCUMENTS

DE 696 01 996 12/1999

(Continued)

*Primary Examiner*—David R Dunn
*Assistant Examiner*—Erika Garrett
(74) *Attorney, Agent, or Firm*—Posz Law Group, PLC

(57) ABSTRACT

A vehicle seat has seating components, such as a seat piece (20), a backrest (22) and a leg-rest (24), which are adjustable as to their positions, particularly in their relative inclination, by at least one operating device (26, 44). A monitoring device monitors all the boundary geometries (50, 52) of the moving seat components which may cause collisions and which have given spatial constraints (54). The monitoring device controls the operating devices (26, 44) at all points to guarantee a collision-free movement of all seat components within the spatial constraints. The vehicle seat considered as a total system can undergo adjustment processes without a damaging collision occurring.

16 Claims, 3 Drawing Sheets

FOREIGN PATENT DOCUMENTS

| | | | | | |
|---|---|---|---|---|---|
| DE | 199 44 620 | 4/2001 | EP | 0 869 061 | 10/1998 |
| EP | 0774913 | 5/1997 | FR | 2 736 879 | 1/1997 |
| | | | JP | 2000-0279478 | 10/2000 |
| | | | WO | WO 01/40013 | 6/2001 |

VEHICLE SEAT WITH SEATING COMPONENTS ADJUSTABLE WITHIN A SPATIAL CONSTRAINT

CROSS REFERENCE TO RELATED APPLICATION

This application is a continuation of U.S. patent application Ser. No. 10/467,829, filed Aug. 13, 2003 now U.S. Pat. No. 7,073,855 and entitled Vehicle Seat with Seating Components Adjustable within a Spatial Constraint, the subject matter of which is hereby incorporated by reference.

FIELD OF THE INVENTION

The present invention relates to a seat, especially a vehicle seat, preferably an aircraft passenger seat, with seat components, like a seat part, a backrest and a leg rest which can be adjusted by at least one actuating means in their position, in particular in their tilt to one another. A monitoring means monitors at least one collision-establishing edge geometry of a movable seat component with an assigned three-dimensional boundary. The monitoring means at any instant ensures collision-free motion of this seat component within this three-dimensional boundary. The three-dimensional boundaries are described at least partially by boundary curves which divide from one another the spaces in which one seat respectively is independently located.

BACKGROUND OF THE INVENTION

DE 199 44 620, which was published subsequently, discloses an aircraft passenger seat having individual seat components, including a leg rest and a backrest. These seat components can be moved by actuating means in the form of servo-drives or actuators which can be triggered by a hand-operated actuating means for adjusting the seat to the requirements of the respective seat occupant. For the seat parts, hand levers are modeled to the contours of these seat parts as part of the actuating means, are combined into a control for adjusting the aircraft passenger seat, and yield meaningful adjustment for the respective seat component. To prevent the seat occupant from striking fixed barriers when adjusting the seat components to his requirements, for example against the rear area of the backrest of a seat located forwardly in the lengthwise direction of the seat, for the servo-drives there are stops against which the respective seat components run. The pertinent respective stop barrier cannot be passed even as the pertinent control button continues to be actuated. Another possibility is to turn off the drive by cam-operated limit switches. The pertinent limiting barriers are not always approached without jerking in the known seat designs. This jerking adversely affects sitting comfort. The respective seat component is also protected by way of stops in the maximum deflection positions such that obvious harmonic motion of all seat components, for example, to "convert" the passenger seat from an upright position into the continuous fully reclined position is not at all possible without obstruction.

To eliminate the above-described defect, EP-B-0774913 discloses a generic motor vehicle or aircraft passenger seat having an electric control which acts on the leg rest to monitor the position of the leg rest position so that collision of the footrest, as an integral component of the leg rest, on the floor is prevented. To accomplish pertinent collision protection, the electronic control, by corresponding sensors, monitors both the actual position of the footrest and the actual position of the leg rest. In doing so, a signal output to the control corresponds to the footrest position and the current leg rest position. Furthermore, the electronic control is used to ascertain whether the footrest for at least one movement of the leg rest out of the leg rest position and when the footrest moves out of the footrest position will collide with the floor and to move the footrest out of the current position into a fixed, secure position if there is the danger that the footrest will touch the floor.

In the pertinent configuration, only one seat component in the form of a leg rest is monitored accordingly and triggered to prevent collision with the floor area. Other seat components, such as the seat part and/or the backrest, are not included, so that relative to these seat components a collision with stationary or other three-dimensional barriers cannot be precluded. Even if the control and monitoring means for the leg rest were to be transferred to the seat part and/or the backrest, possible collisions would only be prevented for the respective seat component, but not for the seat as a whole, since the indicated monitoring systems do not interact with one another. Optionally therefore, in the known approach, before the leg rest strikes the aircraft deck, a possible collision is detected and the entire seat kinematics is stopped and "frozen" in this position. This operation makes unobstructed motion of the entire seat impossible, and accordingly, adversely affects the sitting comfort. Joint motion of all seat components in the known approach is only possible to the extent that by actuating a single actuating button (magic button), all seat components can be moved from the fully reclined position into the upright position and vice versa.

DE-C-195 22 897 discloses an adjustable seat, especially in a motor vehicle, with several adjustment means. Each adjustment means is used for seat adjustment overall or for adjustment of one of the seat components in the pertinent adjustment direction. The first adjustment direction can be actuated by hand or by a servo-drive. One or more other adjustment directions can be actuated by the respective servo-drives. A sensor detects the set positions of the first adjustment means. In a storage, for each of the other adjustments means a characteristic is stored which fixes its theoretical set position depending on the set position of the first adjustment means according to ergonomic aspects. To carry out a seat adjustment process, first the set position desired for the first adjustment means is adjusted and is recognized by the control device by the sensor. Then, the control device, on request by actuating an assigned presetting control element, retrieves from the memory the pertinent theoretical set position for each of the other adjustment means and controls each of the other adjustment means by the corresponding triggering of the servo-drives into their theoretical set positions. In the known approach, therefore, adjustment takes place in two steps (preadjustment and main adjustment). In the preadjustment of one seat component, for example, the seat part is preadjusted in its lengthwise setting. Proceeding from this preadjustment, the other seat components trail, as for example the backrest or headrest, in their adjustment such that for an average seat occupant automatically increased comfort positions are reached depending on the lengthwise adjustment of the seat part. Based on the division into preadjustment and main adjustment, there is no continuous adjustment of all seat components to one another in a common manner. Collision protection, for example relative to the legs of individuals sitting in the back in the vehicle, is not attained.

SUMMARY OF THE INVENTION

An object of the present invention is to provide an improved seat, where the seat, as a complete system, avoids damaging collisions. Other objects of the present invention are to provide a seat meeting increased ergonomic requirements, being economical to produce, and requiring little weight.

These objects are basically attained according to the present invention by a seat, especially a vehicle seat or an aircraft passenger seat, with an overall system ensuring effective collision protection for the seat overall, therefore for all seat components. A monitoring means monitors the respectively collision-establishing edge geometries of all movable seat components and balances these edge geometries with assigned three-dimensional boundaries, such that at any instant collision-free motion of all seat components within the three-dimensional boundaries is ensured.

By monitoring the complete seat overall, movement of all seat components is carried out such that they all remain in a type of envelope curve or envelope for the seat. The envelope curve or envelope is chosen to be three-dimensional such that collisions with fixed three-dimensional boundaries cannot occur. These three-dimensional boundaries themselves in turn could also be movable, for example, formed from the movement spaces of other seats which are located adjacent. If therefore the leg rest is swiveled, for example, in an obvious manner the backrest can track the motion to assume the resting or fully reclined position desired by the seat occupant. The motion of the indicated seat components takes place synchronously within the envelope curve, and at no time a collision due to this common triggering is then possible. The seat support or seat part can also be included in this joint motion of the leg rest and backrest. Regardless of this, it is possible, if one seat component travels into the area of a possible collision with other three-dimensional boundaries, to freeze it in its respective location and to leave the other seat components in their free movement capacity. In this way, the seat occupant can form any number of seat adjustment possibilities within a framework of configurations as wide as possible.

The respective seat parts are coupled to one another in their sequence of motion and move according to a sequence which is selected with regard to ergonomic aspects. In each movement position of the individual seat components relative to one another, it is therefore taken into account that they cannot assume a position relative to one another which is considered uncomfortable for an average seat occupant, for example because the assumed foot position does not ergonomically correspond to the set incline of the backrest and/or of the seat parts. The monitoring means therefore triggers all seat components such that for all seat components an obvious motion sequence situation for the seat occupant is achieved, and still at the same time, collision protection for all components is ensured. Consequently, synchronous triggering and a uniform sequence of motions for all components are possible, and ensure a distinct enhancement of sitting comfort on long-distance flights or the like. Preferably, the monitoring means is provided with a plausibility to prevent the seat from reaching a position which could be dangerous for the seat occupant and could become unacceptable in some other way.

When the respective envelope curve is determined for the seat or its seat components, advantageously the seat contour of the seat occupant is included at the same time in order to prevent the seat itself from satisfying collision avoidance requirements. The seat occupant himself however can make unpleasant contact with the stationary or movable parts of other seats. By incorporating the seat contour into the envelope curve construction, any danger of injury is consequently reliably countered. By virtue of a central drive with which all seat components can be triggered, the seat has a light structure and can be economically built.

The seat of the present invention can be used for a plurality of applications, for example in the medical or therapeutic area, including in the form of various treatment chairs, and for cosmetic use. Preferably, the seat is designed as a high-quality vehicle seat, and can be used in coaches, ferries and the like. Use as a aircraft passenger seat is especially preferred.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
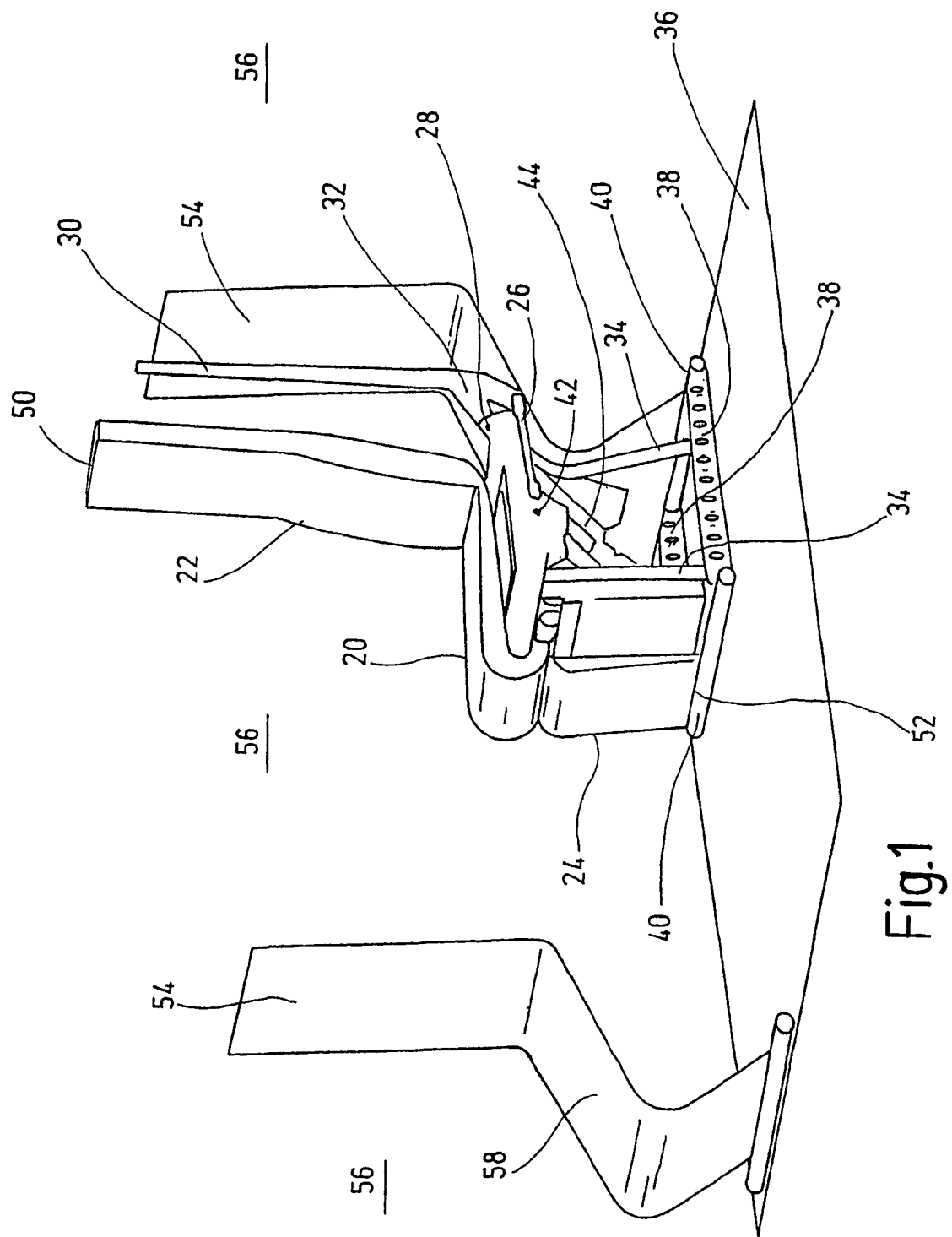
FIG. 1 is a perspective view of an aircraft passenger seat according to an embodiment of the present invention in a fully upright position.

FIG. 1 shows an aircraft passenger seat in the upright position. These aircraft passenger seats with the corresponding level of outfitting are often found in the first class compartment of airliners. The illustrated aircraft passenger seat as shown in FIG. 1, is preferably a component of a compartment. The seat can fundamentally also be used in an arrangement next to another seat repeatedly in a row in business class for a conventional multiseat arrangement. The aircraft passenger seat is composed of individual seat components, such as a seat part 20, a backrest 22 and a leg rest 24. For greater clarity, in addition the cushion support for each seat components is shown only partially, so that the underlying aircraft passenger seat parts are at least partially visible. The backrest 22 is positioned to be able to swivel around an articulation point 28 by a first actuation means 26, partially shown inclined relative to the seat part 20 extending essentially horizontally in the initial position. Of the actual backrest mechanism, the front lengthwise member 30 has a lower end leading into a fork end piece 32. One fork end interacts with the actuation means 26, while the other fork end engages the articulation point 28.

The seat part 20, on its front free end, has a support surface for the thigh of the seat occupant (not shown), and can be mounted by four stationary legs 34 on the cabin floor 36 of a passenger aircraft, a coach or the like, using a pair of floor rails 38. Along the lengthwise direction of the aircraft passenger seat, two pairs of stationary legs 34 are joined at their lower ends to a pair of floor rails 38. The front end and back end of the two floor rails 38 are stiffened with transverse pipes 40. The two pairs of stationary legs 34 pass upwardly into the seat frame 42 which bears the cushion parts of the seat part 20. By another, second actuating means 44, the rear seat edge of the seat part 20 can be lowered to enable an intermediate rest position for the seat occupant which is not detailed. The third actuation means 46 shown in FIG. 2 allows swiveling and tilt adjustment for the leg rest 24. The respective triggering of different seat components by different actuating means is conventional, so that it will not be described. A lightweight construction is considered for the entire seat to be able to raise the vehicle payload accordingly.

Figure 2:
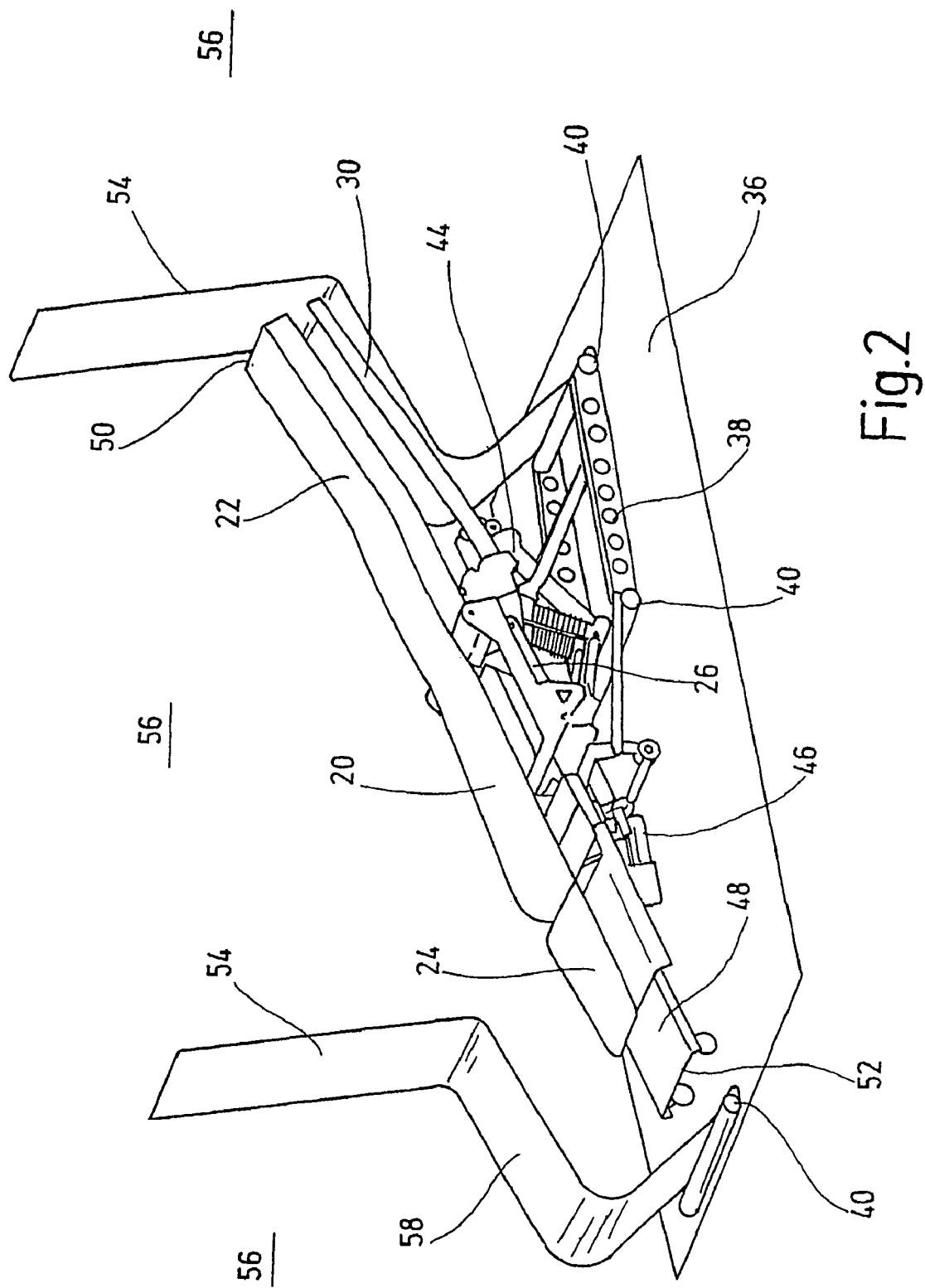
FIG. 2 is a perspective view of the aircraft passenger seat of FIG. 1 in a fully reclined position.

The leg rest 24, on its lower end as shown in FIG. 2, has a leg rest extension 48 held by the actuating means to be able to telescope into and out of the base structure of the leg rest 24. Furthermore, the backrest 22 on its top can be provided with a headrest (not shown), which has a vertical adjustment possibility and is otherwise an integral component of the backrest 22 itself. In the following description, in any case, the top edge of the backrest also includes a possible headrest along its top.

The aircraft passenger seat is equipped with a monitoring means, for example, in the form of a control unit, a computer unit including a process minicomputer or the like. The monitoring means (not shown) is used to monitor the respective collision-establishing edge geometries of the movable seat components with assigned three-dimensional boundaries. The monitoring means ensures collision-free motion of all seat components within the indicated three-dimensional boundaries at any instant by triggering the respective actuating means 26, 44 and 46. The collision-establishing edge geometries in this case are the top edge 50 of the backrest 22 and the bottom 52 of the leg rest 24, optionally with the inclusion of the leg rest extension 48 (cf. FIG. 2). Since each seat component 20, 22, 24, and 48 has its own actuating means 26, 44 and 46, it is provided that the monitoring means detects the positions of each individual actuating means 26, 44 and 46 to obtain mathematical feedback about the position of the seat components. Consequently, it is possible to acquire information about the tilt adjustment angle relative to a reference plane for the seat components by the setting paths of the respective actuating means 26, 44 and 46, with abandonment of possible motion sensors, cam-operated limit switches and the like.

It has proven especially advantageous to make the individual actuating means 26, 44 and 46 in the form of electromechanical actuators in order to obtain a path report about the adjustment path by the adjustment path of the respective actuating rod. In addition to electromechanical actuators, spindle drives and/or hydraulic and pneumatic rod drives or working cylinders can be used. When determining the collision-establishing edge geometries, preferably the body contour of the seat occupant which forms a maximum can also be included in the considerations.

The three-dimensional boundaries are described by boundary curves 54 which divide from one another the spaces 56 in which one seat respectively is independently located on the cabin floor 36. The monitoring means combines all possible movements of the collision-establishing edge geometries 50 and 52 in the manner of a common envelope curve with edges defined at least in part by the boundary curves 54 of the three-dimensional boundary for the seat to prevent collisions. As FIGS. 1 and 2 show, the two boundary curves 54 form the space dividers of a compartment in which the seat occupant moves freely, and can, for example, have access to washing facilities or the like. The indicated boundary curves 54 moreover ensure the private sphere for the seat occupant during his flight. The boundary curves 54 can also form a three-dimensional boundary for the path of travel of another seat (not shown) which is present in a row in front of or behind the indicated seat and which has the corresponding adjustment geometries for its seat components. In this respect, the boundary areas 54 should then be considered to ensure collisions with the preceding and following respective seats.

As shown in FIG. 2, between the indicated boundary curves 54, the seat can be moved out of its completely upright position as shown in FIG. 1 into the fully reclined position (bed position), in which the seat part 20, the backrest 22, the leg rest 24 and optionally the extended leg rest extension 48 establish a plane which is continuously tilted for a resting or sleeping position to be established. To establish the rest position by corresponding actuators, the pairs of stationary legs 34 are tilted far forward around their lower pivots on the two centers of gravity present on the floor rails 38, extending in the lengthwise direction, so that the forward edge of the seat part 20 is tilted down and the rear transition edge to the backrest 22 is raised. The floor rails 38 on which the seat can be mounted are in contact with the rear boundary curve 54 of the illustrated three-dimensional boundary with their respective one free end by way of the rear transverse pipe 40.

By monitoring the complete overall seat, the motion of all seat components is carried out such that they all remain in a type of envelope curve or envelope for the seat. The envelope curve or the envelope being three-dimensionally is selected such that collisions with the fixed three-dimensional boundaries in the form of the boundary curves 54 cannot occur.

Figure 3:
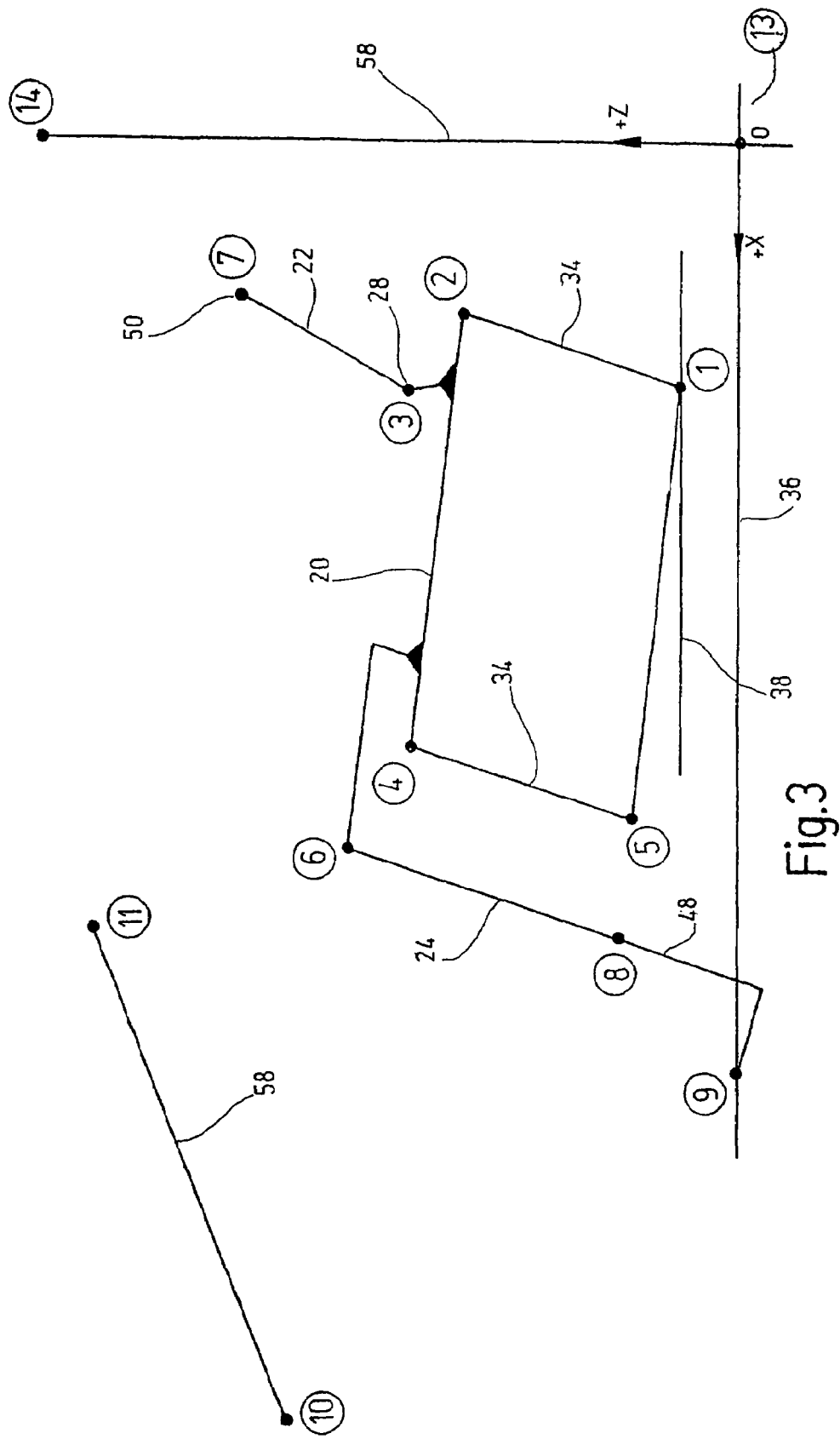
FIG. 3 is a side elevational view of a mathematical articulation model of the aircraft passenger seat of FIG. 1 with boundary lines.

FIG. 3 shows one embodiment of one type of a basic model which defines the actual seat by the corresponding articulation points 1 to 9. The articulation points 1, 2, 4, and 5 tension the frame for the seat frame 42 with the pairs of stationary legs 34. Reference point 1 which is the lower one as viewed in FIG. 3 is raised somewhat by a distance along the Z-axis. This distance corresponds to the height of the respective floor rail 38 relative to the cabin floor 36, which cabin floor defines the zero line or the zero point 13. Viewed from the reference zero point 13 in left direction of FIG. 3 in the horizontal plane, the computation is carried out with positive X values and in the direction of the upper reference point 14 with positive Z coordinates. The end points 3 and 7 in FIG. 3 in the mathematical model border the backrest 22, with the reference point equated to the top edge 50 of the backrest.

The reference point 3 relates to the articulation point 28 for the backrest 22. The seat part 20 extends between the upper points 2 and 4 of the seat frame in the mathematical model shown in FIG. 3. Between points 6 and 8 the leg rest 24 extends and is hinged at the upper point 6 to the seat part 20. At point 8, the leg rest extension 48 extends down. The reference point 9 indicates the top of the foot of the seat occupant who is not detailed, in this way to at least partially include the profile frame of the seat occupant in the mathematical model of motion. The lower reference line shown in FIG. 3, as already described, reproduces the cabin floor 36 as the lower boundary. The vertically extending line 13, 14 represents a simplified mathematical reproduction of the boundary curve 54 which is shown right at the back as viewed in FIGS. 1 and 2. The boundary curve 54 which is the front one viewed in FIGS. 1 and 2 is reflected in the mathematical model in the form of the boundary surface 58 extending between the reference points 10 and 11 in FIG. 3.

The formula summaries shown below are based on the basic mathematical model representation shown in FIG. 3. The selected definitions and mathematical formulations follow from the selected programming language Excel.

| Backrest up | X-Position | | |
|---|---|---|---|
| B3 | Variable | Seat down | Positioner pos. in mm |
| B4 | 13.9−((0.11*B3^2−0.7*B3)/(0.207*B3+1)) | | |
| B10 | Variable | Seat up | Positioner position (length) |
| Definitions!F3 | Constant | Front Leg Geometry | |
| Definitions!F4 | Constant | Front Leg Geometry | |
| Definitions!F5 | Constant | Front Leg Geometry | |
| Definitions!F12 | Constant | Front Leg Geometry | |
| B11 | (B10^2+Definitions!F3^2−2*B10*Definitions!F3* COS(ARCCOS((Definitions!F4^2+B10^2Definitions!F5^2)/2/ Definition!F4/B10)+Definitions!F12*PI( )/180))^0.5 | | |
| Definitions!B3 | Constant | Seat structure geometry | |
| Definitions!B4 | Constant | Seat structure geometry | |
| Definitions!B5 | Constant | Seat structure geometry | |
| Definitions!B7 | Constant | Seat structure geometry | |
| B13 | (Definitions!B5^2+Definitions!B3^2 2*Definitions!B5*Definitions!B3*COS((B4+Definitions!B13)*PI( )/180))^0.5 | | |
| B14 | ARCCOS(((B13^2+Definitions!B3^2−Definitions!B5^2)/2/Definitions!B3/B13))*180/P( ) | | |
| B15 | ARCCOS(((B13^2+Definitions!B7^2−B11^2)B13/2/Definitions!B7)*180/P( ) | | |
| B20 | Definitions!B4^2+Definitions!B3^2−2*Definitions!B4*Definitions!B3* COS((B14+B15+Definitions!B14)*PI( )/180))^0.5 | | |
| B21 | B4−ARCCOS((B20^2+Definitions!B3^2−Definitions!B4^2)/2/B20/Definitions!B3)*180/PI( ) | | |
| B22 | SIN(B21*P( )/180)*B20 | | |
| B25 | Constant | Backrest length | |
| B26 | Variable | Headrest position | |
| B27 | Constant | Backrest upright angle | |
| B29 | Variable | Backrest angle (Operation of the positioner) | |

| Backrest up | Z-Position | | |
|---|---|---|---|
| B3 | Variable | Seat down | Positioner pos. in mm |
| B4 | 13.9−((0.11*B3^2−0.7*B3)/(0.207*B3+1)) | | |
| B10 | Variable | Seat up | Positioner position (length) |
| Definitions!F3 | Constant | Front Leg Geometry | |
| Definitions!F4 | Constant | Front Leg Geometry | |
| Definitions!F5 | Constant | Front Leg Geometry | |
| Definitions!F12 | Constant | Front Leg Geometry | |
| B11 | (B10^2+Definitions!F3^2−2*B10*Definitions!F3*COS(ARCCOS((Definitions!F4^2+B10^2 Definitions!F5^2)/2/Definitions!F4/B10)+Definitions!F12*PI( )/180))^0.5 | | |
| Definitions!B3 | Constant | Seat structure geometry | |
| Definitions!B4 | Constant | Seat structure geometry | |
| Definitions!B5 | Constant | Seat structure geometry | |
| Definitions!B7 | Constant | Seat structure geometry | |
| B13 | (Definitions!B5^2+Definitions!B3^2−2*Definitions!B5*Definitions!B3* COS((B4+Definitions!B13)*PI( )/180))^0.5 | | |
| B14 | ARCCOS(((B13^2+Definitions!B3^2−Definitions!B5^2)/2/Definitions!B3/B13))*180/PI( ) | | |
| B15 | ARCCOS(((B13^2+Definitions!B7^2−B11^2)/B13/2/Definitions!B7)*180/P( ) | | |
| B20 | (Definitions!B4^2+Definitons!B3^2−2*Definitions!B4*Definitions!B3* COS((B14+B15+Definitions!B14)*PI( )/180))^0.5 | | |
| B21 | B4−ARCCOS((B20^2+Definitions!B3^2−Definitions!B4^2)/2/B20/Definitions!B3)*180/PI( ) | | |
| B23 | COS(B21*PI( )/180)*B20 | | |
| B25 | Constant | Backrest length | |
| B26 | Variable | Headrest position | |
| B27 | Constant | Backrest upright angle | |
| B29 | Variable | Backrest angle (Operation of the positioner) | |

Z-Coordinate Backrest +B23+COS((B29+B27)*PI( )/180)*(B25+B26)

| Leg rest | X-Position | | |
|---|---|---|---|
| B3 | Variable | Seat down | Positioner pos. in mm |
| B4 | 13.9−((0.11*B3^2−0.7*B3)/(0.207*B3+1)) | | |
| Definitions!B3 | Constant | Seat Structure Geometry | |
| Definitions!B4 | Constant | Seat Structure Geometry | |
| Definitions! B13 | Constant | Seat Structure Geometry | |
| B10 | Variable | Seat up Positioner position (length) | |
| B13 | (Definitions!B5^2+Definitions!B3^2−2*Definitions!B5*Definitions!B3* COS((B4+Definitions!B13)*PI( )/180))^0.5 | | |
| B14 | ARCCOS(((B13^2+Definitions!B3^2−Definitions IB5^)/2/Definitions!B3/B13))*180/P( ) | | |
| Definitions!F3 | Constant | Front Leg Geometry | |
| Definitions!F4 | Constant | Front Leg Geometry | |
| Definitions!F5 | Constant | Front Leg Geometry | |
| Definitions!F12 | Constant | Front Leg Geometry | |
| B15 | (B10^2+Definitions!F3^2−2*B10*Definitions!F3 *COS(ARCCOS((Definitions!F4^2+B10^2 Definitions!F5^2)/2/ Definitions!F4/B10)+Definitions!F12*PI( )/180)*0.5 | | |

-continued

| | | |
|---|---|---|
| B16 | Constant | Seat angle in upright |
| B17 | B4+B14+B15−90 | Seat angle |
| B18 | B16−B17 | |
| Definitions!B3 | Constant | Seat structure geometry |
| Definitions!B6 | Constant | Seat structure geometry |
| Definitions!B15 | Constant | Seat structure geometry |
| B34 | (Definitions!B6^2+Definitions!B3^2−2*Definitions!B6*Definitions!B3*COS((B14+B15+Definitions!B16)*PI( )/180))^0.5 | |
| B35 | B4−ARCCOS((B34^2+Definitions!B3^2−Definitions!B6^2)/2/Definitions!B3)*180/PI( ) | Footrest auxiliary angle |
| B36 | SIN(B35*PI( )/180)*B34 | Footrest pivot |
| B41 | Constant | Leg rest basic length |
| B43 | Variable | Leg rest extension |
| B45 | Constant | Leg rest stowage angle |
| B46 | Constant | Leg rest positioner stroke max. |
| Leg rest!K5 | (K4−K2)/(K3−K1) | |
| Leg rest!K6 | +K2−K5*K1 | |
| B48 | Variable | +E_Select*LegrestIK5+Legrest!K6 |

X-Coordinate Leg rest extension +B36−SIN((B45+B48−B18)*PI( )/180)*(B41+B43)
Leg rest Z-Position

| | | |
|---|---|---|
| B3 | Variable | Seat down Positioner pos. in mm |
| B4 | 13.9−((0.11*B3^2−0.7*B3)/(0.207*B3+1)) | |
| Definitions!B3 | Constant | Seat Structure Geometry |
| Definitions!B4 | Constant | Seat Structure Geometry |
| Definitions!B13 | Constant | Seat Structure Geometry |
| B10 | Variable | Seat up Positioner position (length) |
| B13 | (Definitions!B5^2+Definitions!B3^2−2*Definitions!B5*Definitions!B3*COS((B4+Definitions!B13)*PI( )/180))^0.5 | |
| B14 | ARCCOS(((B13^2+Definitions!B3^2−Definitions IB5^2)/2/Definitions!B3/B13))*180/P( ) | |
| Definitions!F3 | Constant | Front Leg Geometry |
| Definitions!F4 | Constant | Front Leg Geometry |
| Definitions!F5 | Constant | Front Leg Geometry |
| Definitions!F12 | Constant | Front Leg Geometry |
| B15 | (B10^2+Definitions!F3^2−2*B10*Definitions!F3*COS(ARCCOS((Definitions!F4^2+B10^2 Definitions!F5^2)/2/Definitions!F4/B10)+Definitions!F12*PI( )/180)^0.5 | |
| B16 | Constant | Seat angle in upright |
| B17 | B4+B14+B15−90 | Seat angle |
| B18 | B16−B17 | |
| Definitions!B3 | Constant | Seat structure geometry |
| Definitions!B6 | Constant | Seat structure geometry |
| Definitions!B15 | Constant | Seat structure geometry |
| B34 | (Definitions!B6^2+Definitions!B3^2−2*Definitions!B6*Definitions!B3*COS((B14+B15+Definitions!B15)*PI( )/180))^0.5 | |
| B35 | B4−ARCCOS((B34^2+Definitions!B3^2Definitions!B6^2)/2/B34/Definitions!B3)*180/PI( ) | Footrest aux. angle |
| B37 | COS(B35*PI( )/180)*B34 | Footrest pivot |
| B41 | Constant | Leg rest basic length |
| B43 | Variable | Leg rest extension |
| B45 | Constant | Leg rest stowage angle |
| Leg rest!K5 | (K4−K2)/(K3−K1) | |
| Leg rest!K6 | +K2−K5*K1 | |
| B48 | Variable | +E_Select*LegrestIK5+Legrest!K6 |

Z-Coordinate Leg rest extension +B37−COS((B45+B48−B18)*PI( )/180)*(B41+B43)
Top of foot X-Position

| | | |
|---|---|---|
| B3 | Variable | Seat down Positioner pos. in mm |
| B4 | 13.9−((0.11*B3^2−0.7*B3)/(0.207*B3+1)) | |
| Definitions!B3 | Constant | Seat Structure Geometry |
| Definitions!B4 | Constant | Seat Structure Geometry |
| Definitions!B13 | Constant | Seat Structure Geometry |
| B10 | Variable | Seat up Positioner position (length) |
| B13 | (Definitions!B5^2+Definitions!B3^2−2*Definitions!B5*Definitions!B3*COS((B4+Definitions!B13)*PI( )/180))^0.5 | |
| B14 | ARCCOS(((B13^2+Definitions!B3^2−Definitions IB5^2)/2/Definitions!B3/B13))*180/P( ) | |
| Definitions!F3 | Constant | Front Leg Geometry |
| Definitions!F4 | Constant | Front Leg Geometry |
| Definitions!F5 | Constant | Front Leg Geometry |
| Definitions!F12 | Constant | Front Leg Geometry |

-continued

| | | |
|---|---|---|
| B15 | (B10^2+Definitions!F3^2−2*B10*Definitions!F3* COS(ARCCOS((Definitions!F4^2+B10^2Definitions!F5^2)/2/ Definitions!F4/B10)+Definitions!F12*PI( )/180)^0.5 | |
| B16 | Constant Seat angle in upright | |
| B17 | B4+B14+ Seat angle B15−90 | |
| B18 | B16−B17 | |
| Definitions!B3 | Constant Seat structure geometry | |
| Definitions!B6 | Constant Seat structure geometry | |
| Definitions! B15 | Constant Seat structure geometry | |
| B34 | (Definitions!B6^2+Definitions!B3^2 2*Definitions!B6*Definitions!B3*COS((B14+B15+Definitions!B15)*PI( )/180)^0.5 | |
| B35 | B4−ARCCOS((B34^2+Definitions!B3^2−Definitions!B6^2)/2/ B34/Definitions!B3)*180/PI( ) | Footrest auxiliary angle |
| B36 | SIN(B35*PI( )/180)*B34 | Footrest pivot |
| B46 | Constant | Leg rest positioner stroke max. |
| Leg rest!K5 | (K4−K2)/(K3−K1) | |
| Leg rest!K6 | +K2−K5*K1 | |
| B48 | Variable +E__Select* LegrestIK5+Leg rest!K6 | |
| B53 | Constant Foot angle | |
| B54 | Constant Distance to pivot | |

X-Coordinate Top of Foot +B36−SIN((B53+B48−B18)*PI( )/180)*B54
Top of foot Z-Position

| | | |
|---|---|---|
| B3 | Variable Seat down Positioner pos. in mm | |
| B4 | 13.9−((0.11*B3^2−0.7*B3)/(0.207*B3+1)) | |
| Definitions!B3 | Constant Seat Structure Geometry | |
| Definitions!B5 | Constant Seat Structure Geometry | |
| Definitions! B13 | Constant Seat Structure Geometry | |
| B10 | Variable Seat up Positioner position (length) | |
| B13 | (Definitions!B5^2+Definitions!B3^2 2*Definitions!B5*Definitions!B3*COS((B4+Definitions!B13)*PI( )/180))^0.5 | |
| B14 | ARCCOS(((B13^2+Definitions!B3^2 DefinitionsIB5^2)/2/Definitions!B3/B13))*180/P( ) | |
| Definitions!F3 | Constant Front Leg Geometry | |
| Definitions!F4 | Constant Front Leg Geometry | |
| Definitions!F5 | Constant Front Leg Geometry | |
| Definitions!F12 | Constant Front Leg Geometry | |
| B15 | (B10^2+Definitions!F3^2−2*B10*Definitions!F3*COS(ARCCOS((Definitions!F4^2+ B10^2Definitions!F6^2)/2/ Definitions!F4/B10)+Definitions!F12*PI( )/180)^0.5 | |
| B16 | Constant Seat angle in upright | |
| B17 | B4+B14+ Seat angle B15−90 | |
| B18 | B16−B17 | |
| Definitions!B3 | Constant Seat structure geometry | |
| Definitions!B6 | Constant Seat structure geometry | |
| Definitions! B15 | Constant Seat structure geometry | |
| B34 | (Definitions!B6^2+Definitions!B3^2 2*Definitions!B6*Definitions!B3*COS((B14+B15+Definitions!B15)*PI()/180))^0.5 | |
| B35 | B4−ARCCOS((B34^2+Definitions!B3^2−Definitions!B6^2)/2/B34/ Definitions!B3)*180/PI( ) | Footrest auxiliary angle |
| B37 | COS(B35*PI( )/180)*B34 | Footrest pivot |
| Leg rest!K5 | (K4−K2)/(K3−K1) | |
| Leg rest!K6 | +K2−K5*K1 | |
| B48 | Variable +E__Select*Legrests!K5+Legrest!K6 | |
| B53 | Constant Foot angle | |
| B54 | Constant Distance to pivot | |

Z-Coordinate Top of Foot +B37−COS((B53+B48−B18)*PI( )/180)*B54

Reference is made to the following for explanation of the formulas:

The formula "X coordinate backrest" designates the geometrical characteristic of the top edge 50 of the line of the backrest 22. The variable quantities named in the outline of formulas generally follow from the positioner position of the actuating means in the form of an actuator, for example for the seat part 20 in the lowered position (cf. FIG. 2). "Front leg geometry" means the extension of the leg rest 24 in length. The "backrest length" constitutes the length of the backrest 22, optionally including the headrest position, if a headrest is used, and with its top edge also determines the vertical position of the top edge 50 of the backrest. A raised circumflex (^) means that the following geometrical value must be indexed. Therefore, for example, B3^2 means that the variable B3 which has been determined in each case by way of the positioner position can be taken as a value in the square for use in the other formulas. Conversely, for example, B3^0.5 means that the square root is to be extracted from the value B3. The angle functions can be recognized directly from the formulas, in the same way as the expressions in parentheses. A raised * has the meaning of a multiplication sign. The expression PI( ) means that according to the Excel programming language it is mathematically $\pi$, therefore roughly the constant 3.14. In addition to the X coordinate for the backrest, the Z coordinate for the backrest 22 can also be determined accordingly. Likewise the X and Z coordinates are given below in the formulas for the leg rest extension 48; and the X and Z coordinates of the top of the foot, which is designated 9 in FIG. 3, are accordingly also included in the envelope curve consideration.

If at this point the seat is moved back and forth between its maximum positions as shown in FIGS. 1 and 2 and is optionally adjusted individually, the monitoring means by the aforementioned formulas continuously determines the X and Z coordinates for the backrest 22, the leg rest extension 48 and for the top of the foot 9 of an imaginary seat occupant. It goes without saying that other, possibly collision-establishing edge geometries can be added to the illustrated mathematical base structure in order to determine as accurately as possible the envelope curve within which the seat stops in each possible adjustment position. By stipulating the corresponding boundary surfaces 56 with incorporation of the cabin floor 36, the envelope curve is then limited in its geometrical dimensions, and the monitoring means which stores the pertinent boundary spaces or lines acts on the respective servo drive or the entirety of all servo drives such that collisions are prevented with certainty. If the leg rest 24 is swiveled, for example, the backrest 22 can track the movement in order, for example, to assume the resting or fully reclined position desired by the seat occupant (FIG. 2), then the motion of the indicated seat components 20, 22, 24, 48 taking place synchronously within the envelope curve. At no time is a collision as a result of this joint triggering possible.

While one embodiment has been chosen to illustrate the invention, it will be understood by those skilled in the art that various changes and modifications can be made therein without departing from the scope of the invention as defined in the appended claims.

What is claimed is:

1. A seat, comprising:
   an adjustable first seat component;
   an adjustable second seat component coupled to said first seat component;
   first and second actuating means for adjusting positions of said first and second seat components, respectively, when actuated; and
   monitoring means for monitoring collision-establishing edge geometries of said first and second seat components with assigned first and second three-dimensional boundaries, respectively, at all times during adjustment movements to ensure collision-free motion of said first and second seat components within said three-dimensional boundaries relative to adjacent objects, said three-dimensional boundaries being defined at least partially by boundary curves dividing seat spaces from one another and forming an envelope space, said seat components being movable dependent on one another within said envelope space, said monitoring means controlling all intended motions of said first and second seat components in combination by a mathematical algorithm in a common imaginary envelope curve with edges to prevent collisions at least partially defined by said boundary curves, said mathematical algorithm having equations of straight lines, the number of said equations being increased to form a closed three-dimensional envelope curve defining said envelope space.

2. A seat according to claim 1 wherein
   said first seat component is a backrest;
   said second seat component is a legrest; and
   a seat part extends between said backrest and said legrest.

3. A seat according to claim 2 wherein
   said backrest comprises a telescoping headrest; and
   said legrest comprises a telescoping extension.

4. A seat according to claim 2 wherein
   said collision-establishing edge geometries comprise a top edge of said backrest and a bottom edge of said legrest.

5. A seat according to claim 4 wherein
   body contours of a seat occupant at least partially form said collision-establishing edge geometries.

6. A seat according to claim 1 wherein
   said first and second seat components are angularly adjustable relative to one another.

7. A seat according to claim 1 wherein
   said monitoring means controls all intended motions of said seat components according to a sequence employing ergonomic aspects as factors.

8. A seat according to claim 1 wherein
   said first and second actuating means are independent; and
   said monitoring means detects positions of each of said actuating means.

9. A seat according to claim 8 wherein
   paths of said actuating means are set to allow said monitoring means to detect tilt adjustment angles of said seat components relative to a reference plane.

10. A seat according to claim 9 wherein
    said actuating means are actuators.

11. A seat according to claim 1 wherein
    body contours of a seat occupant at least partially form said collision-establishing edge geometries.

12. A seat according to claim 1 wherein
    said monitoring means checks possible positions of said seat components and precludes misoperation and incorrect positions.

13. A seat according to claim 1 wherein
    said seat components can be moved between a fully upright position and a fully reclined position; and
    in said fully reclined position said seat components are substantially coplanar.

14. A seat according to claim 1 wherein
    said seat components form a vehicle seat.

15. A seat according to claim 1 wherein
    said seat components form an aircraft passenger seat.

16. A seat according to claim 1 wherein
    said actuating means vary tilting of said seat components relative to one another.

* * * * *